Figure 1:
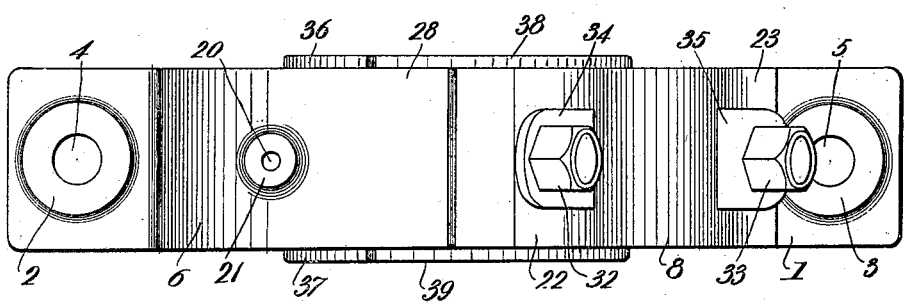

No. 754,871. PATENTED MAR. 15, 1904.
C. H. HOWLAND-SHERMAN.
ANGULAR PEDESTAL.
APPLICATION FILED NOV. 9, 1901. RENEWED AUG. 20, 1903.
NO MODEL. 2 SHEETS—SHEET 1.

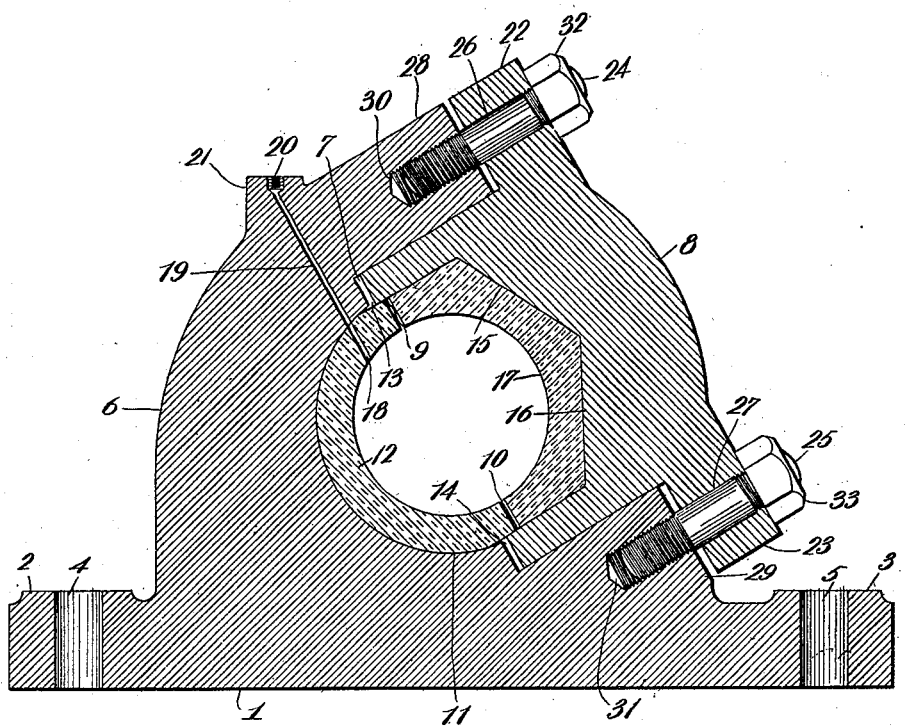

No. 754,871. Patented March 15, 1904.

UNITED STATES PATENT OFFICE.

CHARLES H. HOWLAND-SHERMAN, OF WASHINGTON, DISTRICT OF COLUMBIA, ASSIGNOR, BY DIRECT AND MESNE ASSIGNMENTS, TO THE HOWLAND-SHERMAN MANUFACTURING COMPANY, OF WILMINGTON, DELAWARE, AND BALTIMORE, MARYLAND, A CORPORATION OF DELAWARE.

ANGULAR PEDESTAL.

SPECIFICATION forming part of Letters Patent No. 754,871, dated March 15, 1904.

Application filed November 9, 1901. Renewed August 20, 1903. Serial No. 170,179. (No model.)

*To all whom it may concern:*

Be it known that I, CHARLES H. HOWLAND-SHERMAN, a citizen of the United States, residing at Washington, in the District of Columbia, have invented new and useful Improvements in Angular Pedestals, of which the following is a specification.

My invention relates to improvements in angular pedestals.

It has for its objects the production of a pedestal comprising the minimum practicable number of parts of the simplest possible construction, the reduction of manufacturing and assembling costs to the lowest point consistent with operative efficiency, and such an arrangement of the parts of the invention as shall render them capable of being used for pedestals of all desired angularities, while maintaining substantially equal strength for those pedestals of all angularities having equal bores.

My invention is adapted to employment where separable angular pedestals are used for the construction of machine-bearings which have either an important thrust duty or are required to be sustained conveniently with respect to the machine-frames, so as to act within an arc of oscillation whose chord is substantially perpendicular to their angular axes of inclination.

The simplicity of the parts of my invention and the special method devised for assembling the cap and brasses enable it to be made of a relatively light weight, while imparting exceedingly great strength to the construction. This makes possible its utilization in the restricted spaces frequently required to be occupied by the bearings of presses, punches, shears, &c., where it has often been impracticable to apply separable pedestals and the bearings had to be consequently made integrally with the frames, with the result that any accident destroying the same rendered necessary entirely new frames. It is intended that the economy with which the parts of my pedestal can be manufactured shall render it adaptable also to use in a large class of light machinery—such as threshing-machines, traction-engines, printing-presses, shoemaker's sewing-machines, and small steam-engines—where the required limitations of cost prohibit the employment of detachable bearings notwithstanding the advantage derived therefrom in prolonging the usefulness of the machines.

I accomplish the objects specified by means of the mechanism illustrated in the accompanying drawings and hereby made part of the specification.

Similar numerals of reference indicate similar parts throughout the several views.

Figure 2:
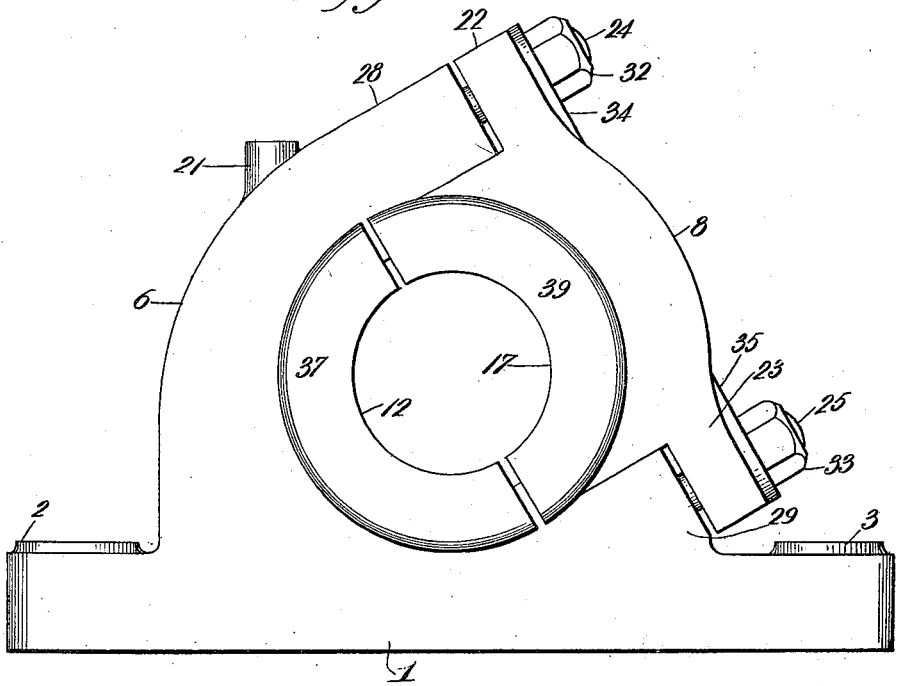

Figure 1 is a top plan view of my invention, showing the relation of the angular cap and the rear sustaining-arch to the pedestal-base. Fig. 2 is a side elevation of my invention, showing the manner in which the brasses are devised to laterally lock the angular cap. Fig. 3 is a central longitudinal section showing the relation of the brasses to the frame and cap, respectively, the method of lubricating the pedestal, and the manner in which the cap locks both the inner and outer brasses.

The example of my invention illustrated in Figs. 1 to 3, inclusive, is a standard thirty-degree to sixty-degree pedestal of the type usually furnished for thrust positions where the outer part has a moderate oscillation around a median center of oscillation having an angle of thirty degrees to base, such as are common in marine-engine work and other expansion and high-duty press linkages.

Referring to the figures, 1 is the base of the pedestal, having at its ends bosses 2 3, through which are bores 4 5, designed to receive the bolts for fixing the pedestal to machine-frames or foundation-settings. When made as indicated particularly in Fig. 3, the pedestal has a solid base, but when it is secured to moving parts or desired to be lightened in weight for any other cause it may be cored out by any of the customary methods.

The inner portion of the pedestal-frame is the sustaining-arch 6, intended in all cases to be solid. The outer portion of the pedestal-frame contains the preferably rectangular recess 7, in which the cap 8 fits accurately by means of the cap-flanges 9 10. The bore 11 is a semicircular recess in the inner portion of the pedestal, in which fits the inner brass 12. This brass 12 has exterior top and bottom flats 13 14, which are engaged by the interior faces of the cap-flanges 9 10 of the cap 8 in such manner as to lock said brass securely and prevent its rotation when the cap has been so adjusted as to press the outer brass home upon the arbor.

The cap has hexagonal flats 15 16, which form, together with the inner faces of the cap-flanges 9 10, lying in true hexagonal directions therewith, a half-hexagon, in which the outer brass 17 is recessed. As the outer brass 17 interiorly fits the periphery of the journal and exteriorly fits the hexagonal flanges of the flats, it is prevented from rotating and locks securely into position when the inward adjustment of the cap brings it to bear upon the arbor. The inner brass 12 has a diagonal drilling 18 in its upper side, registering with a like diagonal drilling 19, running through the sustaining-arch 6 to an oil-cup recess 20 in the boss 21, into which is threaded the tappet of any suitable oil-cup.

The cap 8 has top and bottom flanges 22 23, through which cap-bolts 24 25 are run in bores 26 27. The crown 28 and rest 29 have bores 30 31, in which are studded the cap-bolts 24 25 in such manner that the respective cap-nuts 32 33 are drawn to face upon bolting-bosses 34 35, raised integrally from the sweeps of the bolting-flanges 22 23, as shown particularly in Fig. 2.

Referring to Fig. 1 in conjunction with Fig. 2, it will be seen that the inner brass 12 has right and left flanges 36 37 and that the outer brass 17 has right and left flanges 38 39, which accurately embrace the cheeks of the pedestal in such manner as to form effective lateral locks for the said brasses in respect to the frame to each other and to the cap 8.

The base 1, with its end bosses 2 3, the sustaining-arch 6, the crown 28, and the rest 29 collectively constitute the frame of the pedestal, to which cap 8, with all its parts and the brass carried thereby, acts as the closure.

Having thus described my invention, what I claim is this:

1. Combined in a pedestal, a frame, brasses each having a flattened portion on each side, and a cap having portions designed to engage the frame and the flattened portions of the brasses, substantially as set forth.

2. Combined in a pedestal, a frame, brasses each having oppositely-arranged flattened portions, and a cap having flanges designed to engage the frame and the flattened portions of the brasses and lock the brasses against rotation, substantially as set forth.

3. Combined in a pedestal, a frame, brasses each having an exterior flattened portion on each side lying in the same plane, and a cap having flanges in the plane of said flattened portions and designed to engage and lock both brasses against rotation, substantially as set forth.

4. Combined in a pedestal, a frame having a curved recess in its inner side, an inner brass fitted to said recess and provided with opposite flattened surfaces, an outer brass having a polygonal exterior surface, and a cap shaped to fit the exterior surface of the outer brass and provided with flanges designed to engage the frame and the flattened side surfaces of both brasses, substantially as set forth.

5. Combined in a pedestal, a frame having a curved recess in its side, an inner brass designed to fit said recess and provided with a flattened surface on each side, an outer brass having a polygonal exterior surface, and a cap shaped to fit the exterior surface of the outer brass and provided with flanges designed to engage the frame and the flattened side portions of both brasses, substantially as set forth.

In testimony whereof I affix my signature in presence of two witnesses.

CHARLES H. HOWLAND-SHERMAN.

Witnesses:
C. B. BULL,
CHARLES L. HOWARD.